United States Patent [19]

Shon

[11] Patent Number: 5,193,164

[45] Date of Patent: Mar. 9, 1993

[54] DATA DESKEWING APPARATUS UTILIZING BANK SWITCHED RANDOM ACCESS MEMORIES

[75] Inventor: Russell D. Shon, San Diego, Calif.

[73] Assignee: Eastman Kodak Company, Rochester, N.Y.

[21] Appl. No.: 601,548

[22] Filed: Oct. 22, 1990

[51] Int. Cl.⁵ .............................................. G06F 13/00
[52] U.S. Cl. .................... 395/425; 360/39; 360/47; 360/51
[58] Field of Search .............................. 395/400, 425; 364/200 MS, 900 MS; 360/39, 43, 47, 49, 50, 51, 54

[56] References Cited

U.S. PATENT DOCUMENTS

| | | | |
|---|---|---|---|
| 4,316,223 | 2/1982 | Baldwin et al. | 360/39 |
| 4,356,518 | 10/1982 | Lemoine et al. | 360/39 |
| 4,499,507 | 2/1985 | Yamada et al. | 360/51 |
| 4,636,877 | 1/1987 | Ido | 360/51 |
| 4,803,566 | 2/1989 | Berlekamp et al. | 360/26 |

OTHER PUBLICATIONS

"The Complete Handbook of Magnetic Recording", Finn Jorgenson, 3rd Edition, pp. 360-361.

Primary Examiner—Joseph L. Dixon
Assistant Examiner—Frank J. Asta
Attorney, Agent, or Firm—Dennis P. Monteith; Thomas H. Close

[57] ABSTRACT

Data deskewing apparatus includes two, byte organized random access memories for storing, aligning and then reading out channels of data which were originally skewed when read in from a multitrack magnetic recorder system. While write-in operations on skewed data are taking place in one of the random access memories (RAM), read-out operations on skew-corrected data, which had been written in on the previous cycle, are taking place in the other RAM. On the completion of a write in/read out cycle, the roles of the RAM's are interchanged, and the process repeated.

6 Claims, 6 Drawing Sheets

DATA DESKEWING APPARATUS UTILIZING BANK SWITCHED RANDOM ACCESS MEMORIES

FIELD OF THE INVENTION

This invention relates to coherence of the recovered data in multichannel parallel digital data streams, and in particular to apparatus for deskewing the reproduced data of a multichannel magnetic tape recorder/reproducer system.

DESCRIPTION RELATIVE TO THE PRIOR ART

A multichannel digital magnetic tape recorder/reproducer system provides an effective and economical storage means for large quantities of digital data. As the number of data tracks across the tape and as the linear data packing density along each track are increased, the areal packing density results in highly efficient utilization of the magnetic medium. Storage greater than 20 megabits per square inch of media is currently available in the modern multichannel tape system.

A multichannel recorder comprises a longitudinally transported magnetic tape traversing a multitrack record head which effects the data recording. The channels of data are simultaneously applied to the inputs of channel record amplifiers which drive the magnetic record head to effect data recording on the tape. The multitrack record head has a stack of transducer structures with recording gaps disposed along a common line transverse to the longitudinal motion of the tape. This line is designated as the head's gap line, and in an ideal multitrack record head the individual transducer gaps fall precisely on the nominal gap line with no gap scatter. Modern thin film deposited multitrack heads fabricated on a common substrate, closely approximate the ideal head with respect to gap scatter, however, some gap scatter may be present. Additionally, the gap line of one tape transport may be slightly skewed with respect to the gap line of a compatible transport. Thus, a tape recorded on the first transport will not have an identical recording pattern as that of a tape recorded on the second transport with a head having a skewed gap line. Using a compatible multitrack reproduce system for playback of both the tapes, there will be a time displacement between the signals from the channels reproduced from the first tape compared to the reproduced signals from the second tape.

In addition to the above described sources of static skew, dynamic skew is also present due to uneven guiding and weaving of the tape across the record head. If the direction of the tape travel instantaneously varies from perpendicularity with respect to the gap line, the recorded pattern will be skewed across the recorded tracks. Dynamic skew may arise from perturbations in the mechanical operation of the transport mechanism, or from undulations in the tape edge in edge guided tape transports.

The above skewing effects occur not only on recording, but independently occur on playback due to the corresponding characteristics of the multichannel reproduce heads and reproduce transports. The total channel to channel skew from record to playback of the stored data is therefore a function of the overall recorder/reproducer system parameters. Skew correction is required in these systems to ensure that data that was simultaneously presented to the inputs of the channel record amplifiers are also simultaneously available at the outputs of the reproduce system.

Skew correction in early multichannel tape systems with low packing density along the tape track was relatively easy to perform. At low packing densities there were comparatively long blank regions between the recorded flux changes. A reproduced bit from any channel turned on a "one shot" which was timed to turn off after all possible skewed channel signals were read out from the tape, but before a new data bit could appear. With the "one shot" turned off, all the reproduced channel lines were simultaneously strobed to determine the status of their output states, which provided the multichannel readout of the deskewed data.

As the art progressed and linear packing density increased, more sophisticated skew correction methods became necessary. There were no longer adequate spaces between the read out pulses in each channel that could be relied on to provide a "breathing space" to allow for all channels to read a bit out before new data appeared. Skew correction techniques were developed utilizing FIFO (first in, first out) deskewing buffer storage registers which held and aligned the bits of each channel until corresponding channel bits could be simultaneously strobed out. The general technique is described in "The Complete Handbook of Magnetic Recording", Finn Jorgensen, 3rd Edition, Tab Books, Blue Ridge Summit, PA, pp. 360-361, and a more sophisticated deskewing FIFO apparatus is disclosed in U.S. Pat. No. 4,803,566 in the names of Berlekamp, et al. It will be noted with respect to these FIFO techniques, that as the tape packing density increases, and the number of bits that can be misaligned between two skewed tracks attendantly increases, it is necessary to correspondingly increase the lengths of the FIFO registers to compensate for a given amount of skew. This increases the size, cost and complexity of the FIFO deskewer apparatus with increasing linear tape packing density.

U.S. Pat. No. 4,499,507 in the names of Yamada, et al, discloses a deskewer incorporating a random access memory capable of storing at selected addresses the single bit values read from the tape. Each address consists of the track number of the bit, and of the numerical value specifying the position of the bit along the bit sequence of a frame of data. Yamada, et al allow a sufficient amount of time to read in corresponding bits from the tracks of a multitrack playback system, and immediately read out the stored values before new data can be expected to start reading in. Yamada, et al's memory must operate at least at the rate at which bits are being read from the tape, and this may be at a very high rate requiring significant current flows in the deskewer.

Additionally, the amount of skew which can be handled by Yamada, et al's deskewer is limited to the number of bits equal to ½ the length of the data frame. To increase the skew handling capacity it is necessary to increase the number of bits in a frame and consequently to increase the size of the memory to store the additional bits, again increasing cost, size and complexity.

SUMMARY OF THE INVENTION

The invention teaches the use of a bank of two, byte organized random access memories for storing, aligning and then reading out channels of data which were originally skewed when read in from a multitrack magnetic recorder system. While write in operations on skewed data are taking place in one of the random access memories (RAM), read out operations on skew corrected data which had been previously read in on the previous cycle, are taking place in the other RAM. On the completion of a write in/read out cycle, the roles of the RAM's are interchanged, and the process repeated.

Because RAM storage is byte organized, data transfers into the RAM are at a much lower rate, i.e. the bit rate divided by eight, than the bit rate transfers practiced in the prior art. This increases reliability as adequate time is available to insure that data will be static at the RAM data port, and will not be transient at data transfer time.

The present invention, unlike the practice of the prior art, allows correction of varying amounts of skew without increasing the capacity of the RAMs. To increase the skew handling capability, it is only necessary to change the tape format to increase the length of its preamble. In this manner, sufficient time is provided to insure that no matter how great the time interval between the earliest read-in channel and the latest read-in channel, the read-in cycle is long enough to accommodate accepting data from all tracks.

BRIEF DESCRIPTION OF THE DRAWINGS

The invention may be understood with respect to the FIGS. of which.

DETAILED DESCRIPTION OF A PREFERRED EMBODIMENT

In the following description, a "byte" is defined as consisting of eight bits. The invention is described in terms of 8-bit bytes, and in terms of a recorder/reproducer having eight track record/reproduce channels. It will be appreciated that these values are selected solely for definiteness in the description, and that the teaching of the invention is applicable to bytes of any size, and to multitrack record/reproduce systems of any number of channels compatible with the storage characteristics of commercially available random access memories (RAMs).

Figure 1:
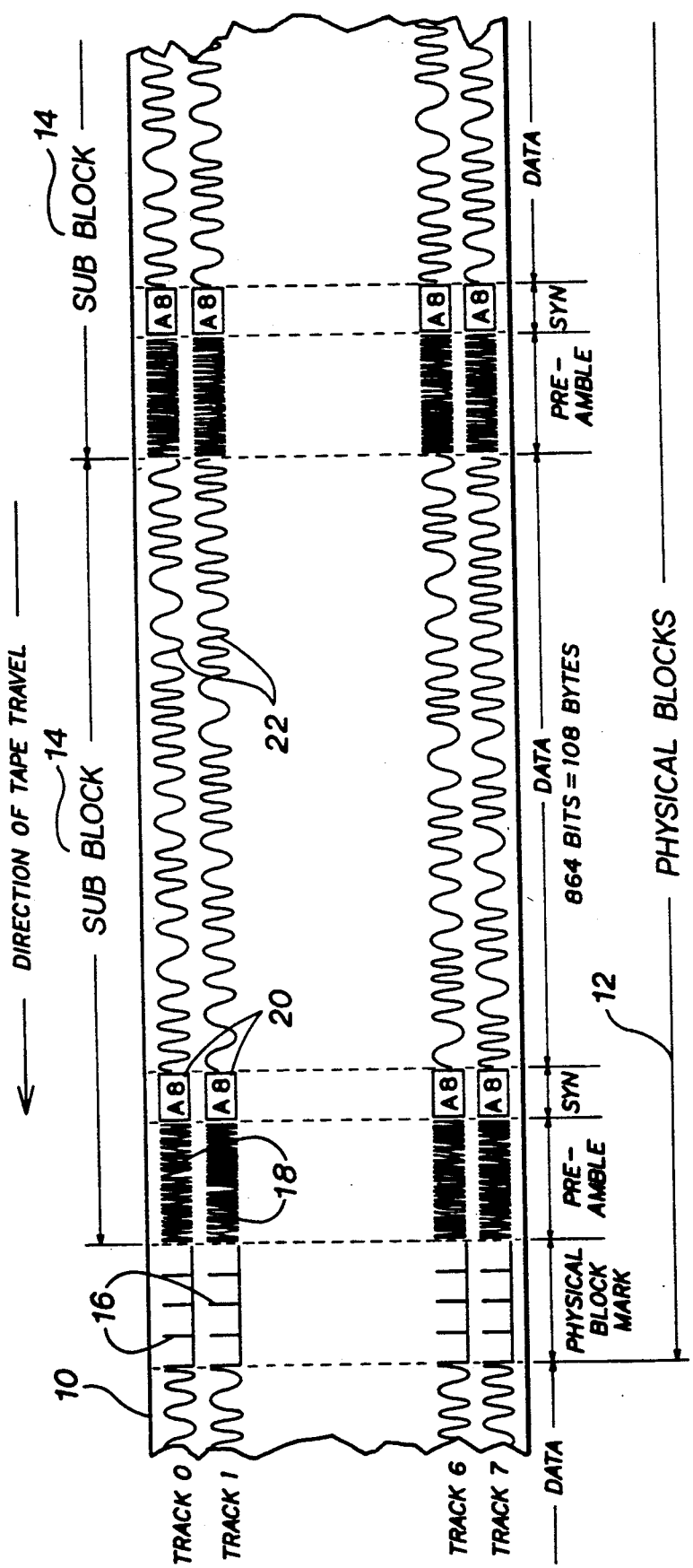
FIG. 1 illustrates the recorded format of a multichannel tape useful in understanding the invention.

Referring to FIG. 1, the playback of an 8-track magnetic tape 10 results in eight data channels of information which may be time displaced with respect to each other due to tape recorder/reproducer skew. Information is recorded on tracks 0 through 7 on the tape 10 in a format consisting of physical blocks 12 which in turn consist of collections of identically formatted subblocks 14. The beginning of each of the physical blocks 12 is a low frequency marker signal 16 and the beginning of each subblock 14 is a preamble 18 which is a very high frequency signal. The frequency contents of the marker signal 16 and the preamble 18 are such as to allow a marker or a preamble to be readily identified and separated from the data signals on the tape. The preamble 18 is immediately followed by a synchronizing (sync) byte 20, having the hexadecimal value "A8", and following the sync byte 20 is a segment of data 22 consisting of 864 bits, i.e. 108 eight-bit bytes. The next subblock's preamble immediately follows the end of a data segment 22.

The multitrack information on the tape 10 is reproduced using a magnetic tape playback system in a manner known in the art. Each track of information, i.e. track 0 through 7, is transmitted through its own reproduce channel, and the outputs of the reproduce channels drive the deskewer of the present invention. The data bit rate through each of the channels is 5 MHz.

Figure 2:
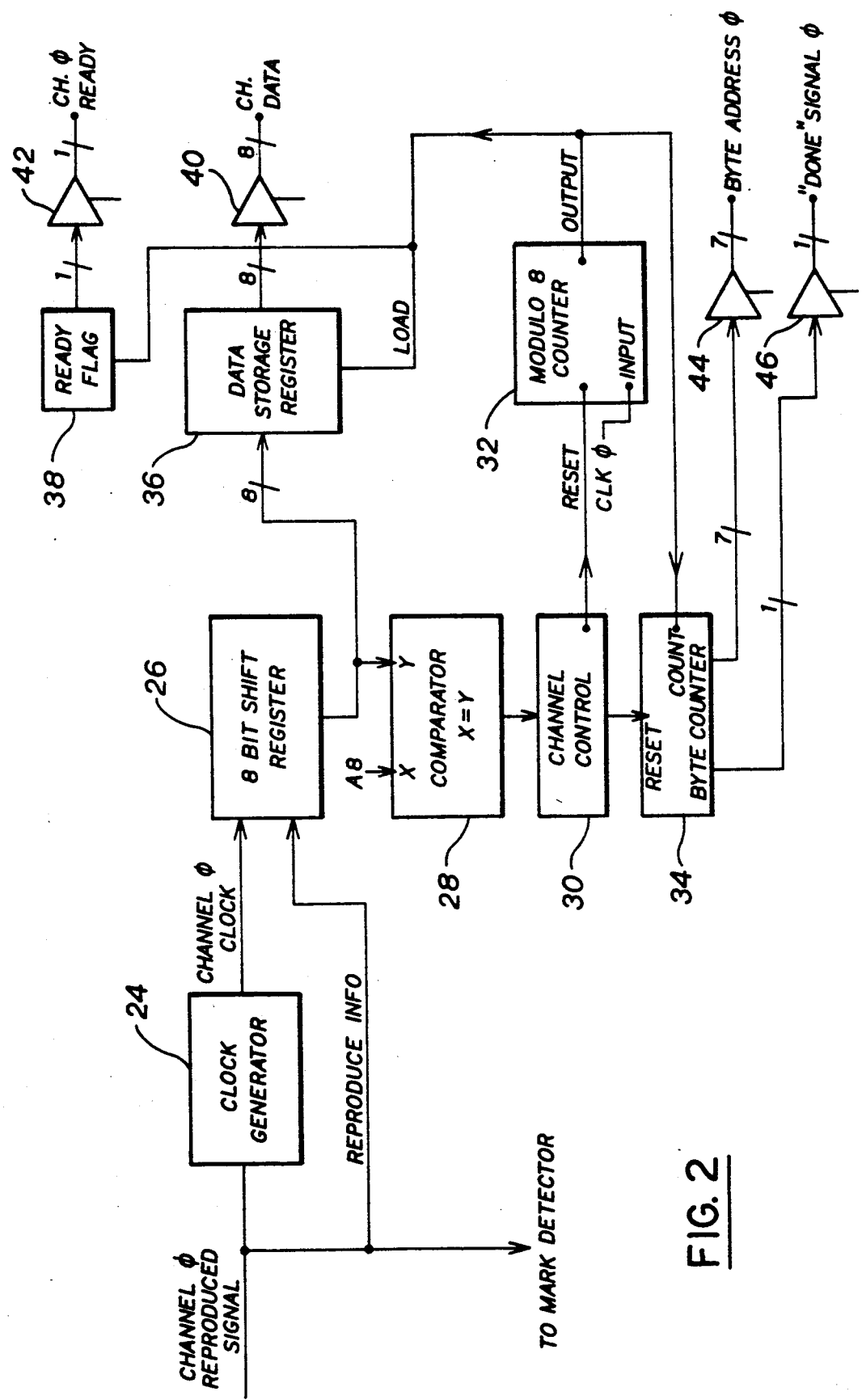
FIG. 2 is a block diagram of a typical channel of the diskewer the invention.

In FIG. 2, an input channel of the deskewer is identified as that of channel 0 for convenience of description, and it will be appreciated that the apparatus of FIG. 2 is identical for each of the other seven channels of the deskewer. As channel 0 information is reproduced, it feeds a phase locked channel 0 clock generator 24 which strips the channel 0 clock from the channel 0 data signals, which are coded for self clocking in a manner known in the art. The channel 0 data is applied to the input of an 8-bit channel 0 shift register 26 and the channel 0 clock shifts the data through the channel 0 shift register 26.

The contents of the channel 0 shift register 26 is continually being compared to the hexadecimal value "A8", i.e. the sync mark 20, stored in the channel 0 comparator 28. When a sync mark, A8, has been shifted into the channel 0 shift register 26, the channel 0 comparator 28 activates a channel 0 control 30. Channel 0 control 30 resets a channel 0 modulo 8 counter 32, whose input is driven by the channel 0 clock, and also resets a channel 0 byte counter 34, whose input is driven by the output of the channel 0 modulo 8 counter 32.

Recall from FIG. 1 that a data segment immediately follows A8, so the next channel 0 reproduce information fed into the shift register 26 are the bits of the first channel 0 data byte. As the eight bits of the first byte of channel 0 data feed into the channel 0 shift register 26, eight cycles of the channel 0 clock, one for each bit, will be accumulated in the channel 0 modulo 8 counter 32, and as the counter 32 recycles on the count of eight, it parallel loads the byte present in the channel 0 shift register 26 into an 8-bit channel 0 data storage register 36. At the same time, a channel 0 ready flag 38 is set, indicating that a byte is in the channel 0 data storage register 36. The eight output lines of the channel 0 data storage register are connected to eight channel 0 tri-state data buffers 40, represented for clarity by the single reference symbol 40. (This convention is followed throughout the drawings. The number of interconnections characterizing a multiconnection bus is shown as a single line, and the number of lines comprising the bus is indicated by a contiguous numeric value followed by a slash across the line.) The channel 0 ready flag 38, which is a storage flip-flop, feeds a channel 0 tri-state ready flag buffer 42.

When the channel 0 modulo 8 counter 32 recycles it also advances the channel 0 byte counter 34, so that the number in the channel 0 counter 34 is the numerical value of the temporarily stored byte's position in the channel 0 byte sequence since the sync mark last occurred in channel 0. The value of this count uniquely defines the position of the byte in a given channel, and is used as the byte part of the address for later writing into a random access memory. This address is present on seven output lines of the channel 0 byte counter 34 and feeds seven channel 0 tri-state address buffers 44. As stated in connection with FIG. 1, a subblock contains 108 bytes of data, and when the channel 0 byte counter 34 reaches a count of 108 a complete subblock of channel 0 has been processed. The count of 108 is detected in the channel 0 byte counter 34, and a channel 0 "DONE" signal is generated, the channel O "DONE" siganl feeding a channel O "DONE" buffer 46.

Figure 3:
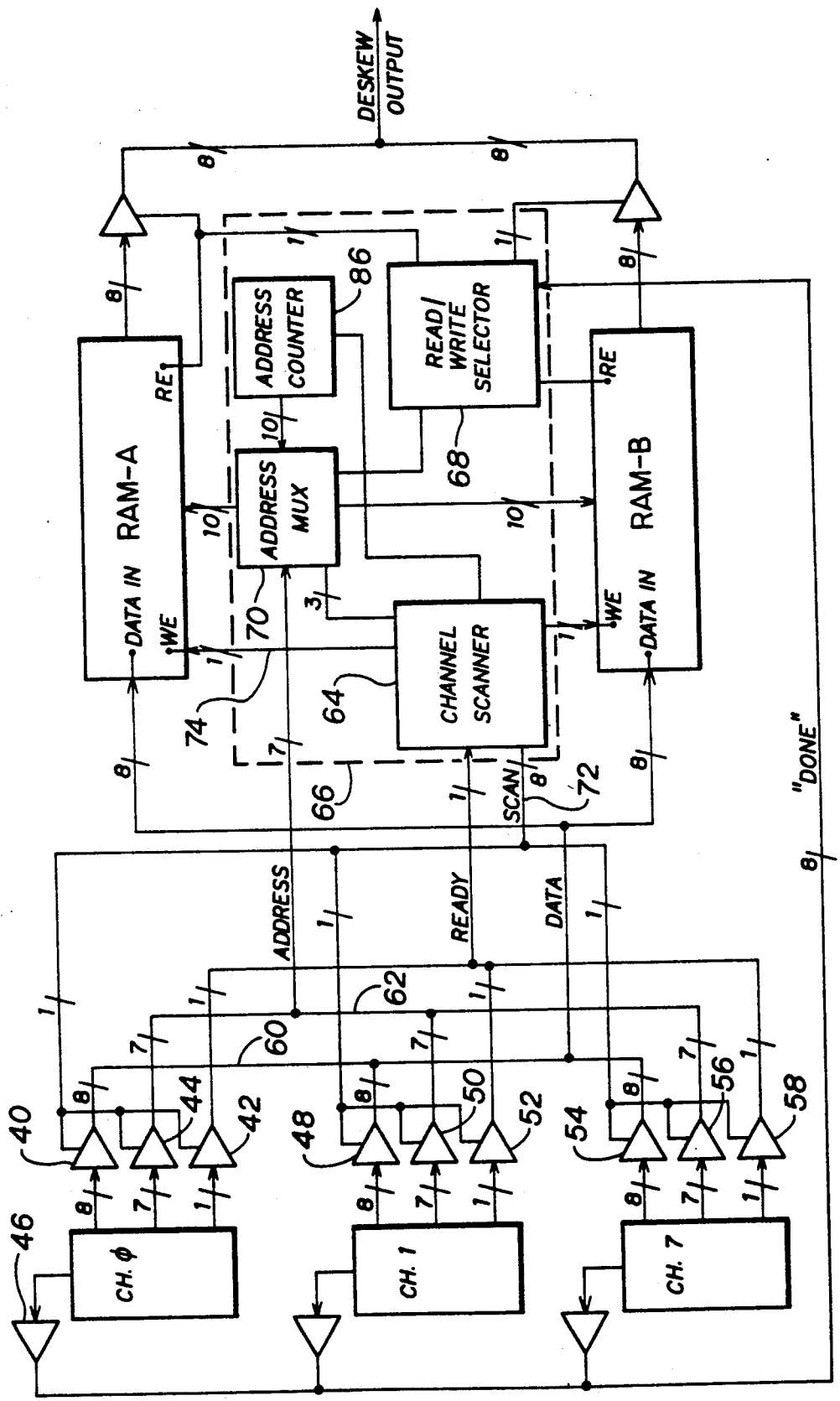
FIG. 3 is an overall block diagram of the deskewer of the invention.

It will be appreciated that while the above described operations of channel 0 are in progress, corresponding operations are also taking place in channels 1 through 7, albeit that time displacements among the bytes of the various channels due to skew are present. An overall view of how the channels' data are processed to eliminate the skew effects may be understood by consideration of FIG. 3. The following portion of the deskewer operation description assumes that data is being written into the RAM A.

Channel 0 (Ch0) outputs, and channel 1 (Ch1) . . . through channel 7 (Ch7) outputs are shown with the outputs of the CH0 data buffer 40, Ch1 data buffer 48 . . . through Ch7 data buffer 54 all bussed together onto an 8-line data bus 60. Similarly, the Ch0 address buffer 44, Ch1 address buffer, 50 . . . through Ch7 address buffer 56 are all bussed together onto a 7-line address bus 62. The outputs from the Ch0 ready buffer 42, Ch1 ready buffer 52 . . . through Ch7 ready buffer 58 are bussed together onto a single ready signal bus connected to a channel scanner 64 which is part of a global controller 66. Assuming for the present that data from the channels 0-7 are being written into a random access memory, RAM A, and that previously processed, and now deskewed, data is being read out of a random access memory, RAM B. (Writing into one RAM, while reading out of the other RAM is under control of a Read/Write Selector 68, in a manner which will be described in detail below.)

The eight data lines on the bus 60 are hard wired to both the RAM A and RAM B data input ports. The address of any byte of data is uniquely determined by two pieces of information: the track number from which the byte originated (3 bits), and the position the byte occupied in the byte sequence after the sync mark (7 bits). These two pieces of information are used to specify the RAM address of the bytes as they are processed. The 3-bit track number portion of the address is generated in the channel scanner 64, and the byte sequence value is the output of a byte counter, i.e. Ch0 byte counter 34, which appears on the address bus 62. The ten address bits are fed to an address multiplexer 70 in the global controller 66, and while writing into the RAM A, the multiplexer connects these address lines to the ten address lines of the RAM A.

The writing of reproduced data into the RAM A proceeds in the following manner. The channel scanner 64 repetitively scans across the eight channels in a sequential manner by means of the eight scan lines 72. It will be noted that the enable lines of the tri-state buffers for each channel are connected together, for example, the enable lines of buffers 40,42,44 are tied together, as are those of buffers 48,50,52 and buffers 54,56,58. When the channel scanner 64 is scanning a channel, whatever signals are on the inputs of the selected data buffer and selected address buffer appear on the data bus 60 and address bus 62, respectively, because the enable positions are being polled. Unless the channel ready flag is set, indicating that the channel data storage has a data byte in place, no data is transferred into the RAM A. However, if a ready flag is set, then when the ready buffer is enabled by the scanner signal, an "O.K. to Write" signal is detected in the scanner 64, which outputs a write enable signal to the RAM A via the line 74, and the data on the bus 60 is written to RAM A at the address consisting of the track address and the address on the bus 62. After the data is written into the RAM A the ready flag 38 is reset, and the channel scanner 64 selects the next channel. The bit rate in each channel is 5 MHz, but the channel scanner operates at a 10 MHz bit rate to ensure that no new data can replace a valid byte in a storage register before the valid byte can be scanned at least once for transfer to the RAM.

As the channels are being scanned, it will be appreciated that depending upon the skew conditions, bytes from the various tracks and the various byte locations along a track, can randomly signal, via the ready flags, that they are ready for transfer to the RAM. For example, perhaps the ready flag for channel 4 becomes set, and the channel 4 byte address is "67", the data is transferred to the RAM at hexadecimal address "43". The next flag may go up for track 2, byte sequence 25, and the byte is appropriately transferred to RAM. The bytes are transferred into the RAM at random times depending upon the characteristics of the skew until the entire subblock of data has been written into the RAM. It will be seen by visualizing the RAM memory locations as a two-dimensional array corresponding to the original format of the deskewed data that the data may be read out from the RAM, byte by byte, in a completely deskewed manner.

Figure 4:
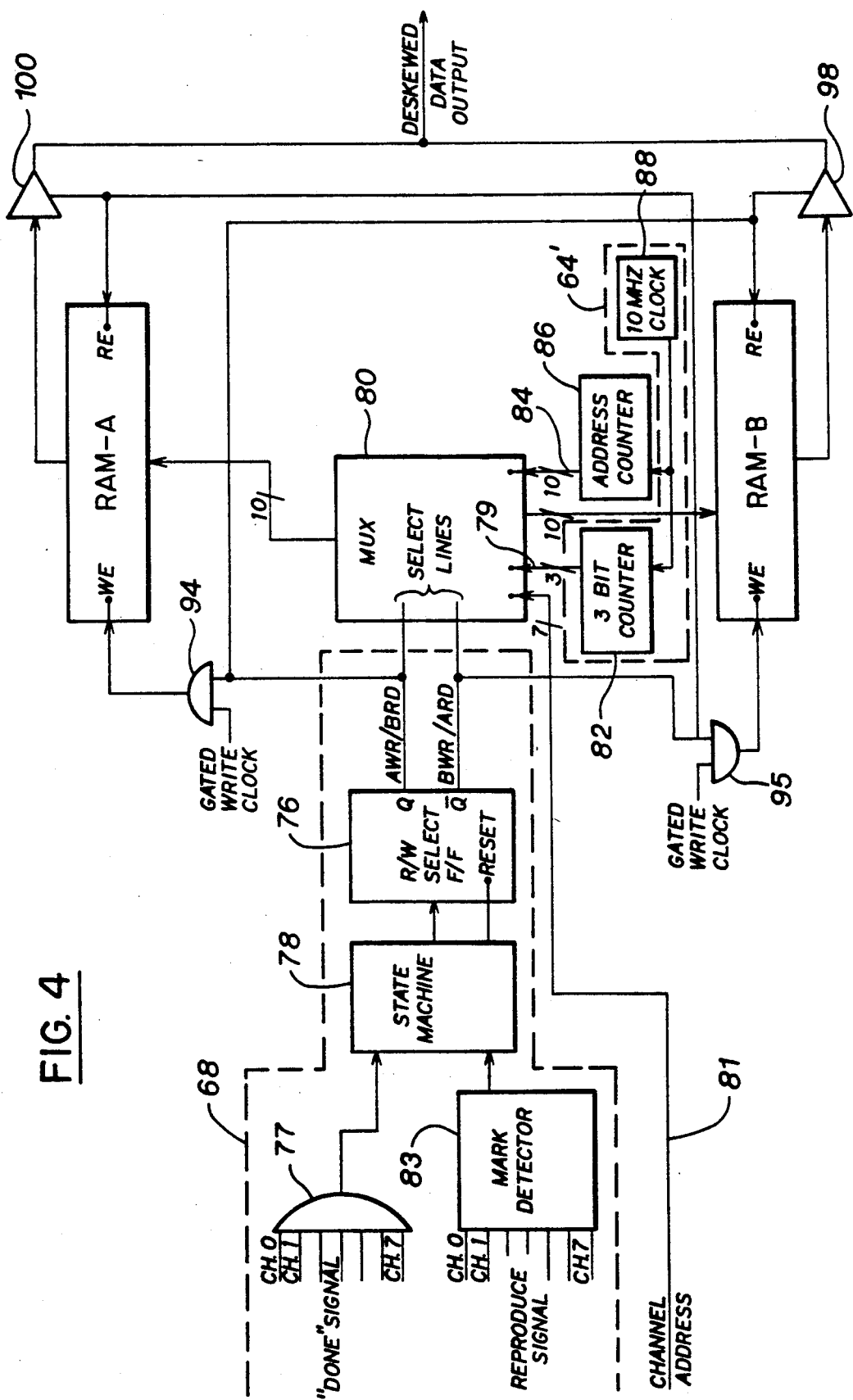
FIG. 4 is a block diagram of the random access memory selector and the address multiplexer of the deskewer of the invention.

Before providing a more detailed description of the write-in operation, and a description of the read-out operation, the read/write selection process will be described by reference to FIG. 4. The channel scanner 64 of FIG. 3 comprises a read/write select flip flop 76 whose outputs control the bank switching of RAM A and RAM B between write-in and read-out mode. The control signals, "A write/B read", and "A read/B write" are alternating signals which are the Q and Q-not outputs of the flip flop 76. A state machine 78 conditions the flip flop 76 by sequencing the reset of the flip flop 76 after detection of the physical block signal 16 and preambles 18 (FIG. 1) by a "mark" detector 83. As previously described, after the byte counter 34 (FIG. 2) reaches a count of 108 signifying that a subblock has been written to a RAM, the "DONE" signal is generated in the channel. The "DONE" signals from all eight tape channels feed an "and" gate 77 whose output passes through the state machine 78 to drive the input of the flip flop 76. Therefore, when all eight channels have processed the data of a subblock, all the "DONE" signals are "high", the flip flop 76 transfers, and the roles of the RAMs are bank switched and positioned for processing the next subblock.

In bank switching RAM A and RAM B, a multiplexer 80 is used to transfer the address lines under control of the "A write/B read" and "B write/A read" signals from RAM A to RAM B. The multiplexer 80 is configured in a manner well known in the art using logic elements such as illustrated by the Texas Instrument Co., Dallas, Tex., Data Selector/Multiplexer SN 54157. In the preferred embodiment, the multiplexer 80 is implemented in an Altera EPM 5128 Erasable Programmable Logic Device, as are the other logic elements of the deskewer of the invention. This programmable logic device is available from the Altera Corp., Santa Clara, Calif. The multiplexer 80 connects seven channel address lines 81 and the output of a 3-bit counter 82, whose count is the track designation portion of the address, to the RAM which is being written into.

The multiplexer simultaneously connects ten address lines 84 which are generated in an address counter 86 to the RAM which is being read out. Both the 3-bit counter 82 and address counter 86 are driven by a 10 MHz clock 88. (The 3-bit counter 82 and the 10 MHz clock 88 are identified as being parts of the channel scanner 64 of FIG. 3, by means of the primed reference number 64'.) The write and read operations are described in further detail below.

Figure 5:
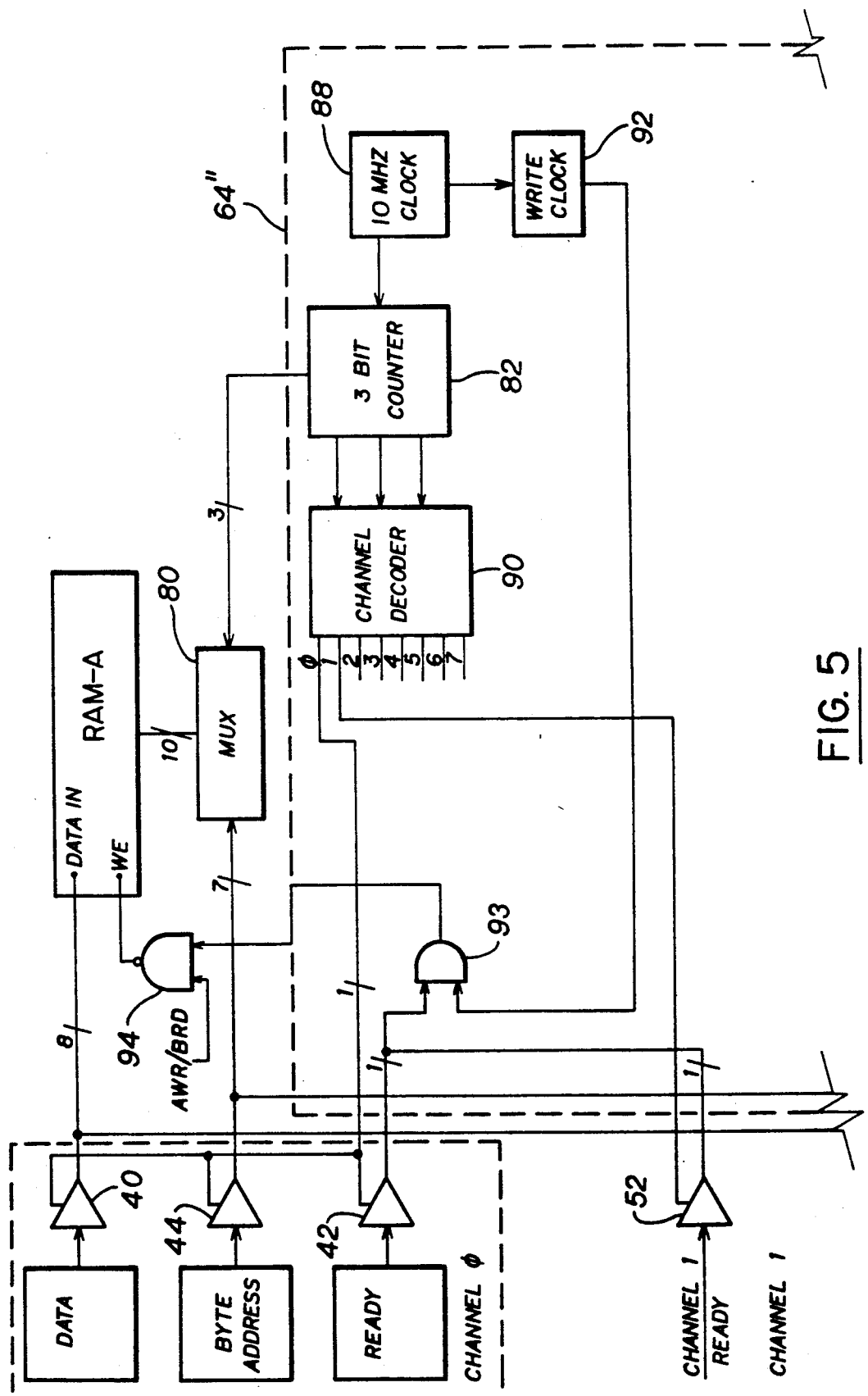
FIG. 5 is a block diagram of circuits used in the write a random access memory.

The write into RAM A operation may be understood by reference to FIG. 5. Channel 0 is shown with its tri-state data buffers 40, tri-state byte address buffers 44, and tri-state ready flag buffer 42. As previously stated the outputs of all the channel data buffers are bussed together and connected to the data input ports of RAM A and RAM B, and all the outputs of the channel address buffers are bussed together and fed to the channel address input ports of the multiplexer 80. A portion of the channel selector 64, designated 64', contains the 3-bit counter 82 driven by the 10 MHz clock 88, as previously mentioned, connected to a 3-bit to 8-line decoder 90. The eight output lines of the channel decoder 90 are connected, respectively, to the enable ports of the corresponding channel buffers. For example, the 0 output line of the decoder 90 connects to each of the enable ports of the channel 0 buffers 40,42,44. The other outputs of the channel decoder 90 are connected to the corresponding enable lines of the other channel buffers. As the 3-bit counter 82 cycles at a 10 MHz rate, the output of the channel decoder scans across the enable ports of the channel buffers in sequence. At the same time, the three address lines corresponding to the channel being scanned are applied to the multiplexer 80.

Figure 6:
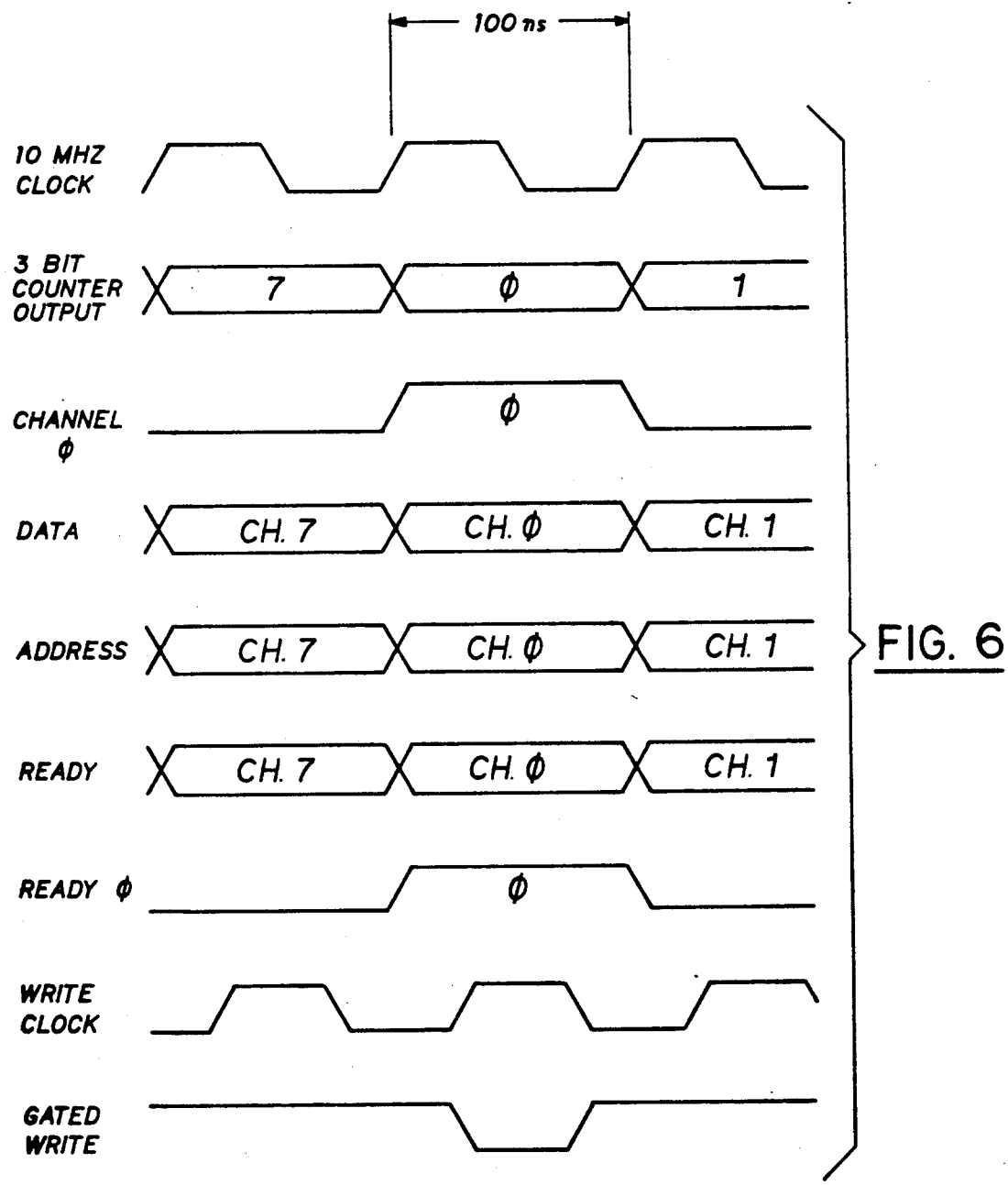
FIG. 6 are waveforms useful in understanding the operation of the circuits illustrated in FIG. 5.

Referring now to FIG. 6, the waveforms associated with the write operation begin with consideration of the 10 MHz clock, which has, of course, a 100 nanosecond (ns) period. The 3-bit counter 82 transfers every 100 ns, repetitively cycling from 0 through 7, and causing one of the seven decoded outputs to go "high" at that rate. As shown in the third waveform, for example, the channel 0 decoded output is "high", enabling the channel 0 tri-state buffers 40,42,44. The channel 0 data output from the tri-state buffer 40 feeds channel 0 data to the RAM data inputs via the data bus, the byte address is fed to the multiplexer 80 address port along with the 3-bit counter 82 track portion of the address. (See FIG. 5.) As previously described, for the present example, the multiplexer 80 feeds the address lines of the RAM A. The "high" output of the channel decoder 90 also enables the channel 0 ready flag tri-state buffer 42, and if the ready flag is "high", the output of the tri-state ready flag buffer 42 also goes "high". This gates the write clock 92, whose waveform is seen in FIG. 6, to an AND gate 93. The write clock 92 is a 10 MHz clock, derived from, and delayed with respect to, the 10 MHz clock 88. The gated write clock 92 is passed through a "nand" gate 94, whose other input is the "A Write/B Read" signal, which in the present example, is "high" enabling the RAM A for the writing mode. On the rise of the inverted gated write clock at the write enable input, WE, of the RAM A, the data on the data bus is transferred into the RAM A at the location corresponding to the address present on the address bus.

Coincidental with the write operation into RAM A described above, the reading out of data from RAM B is taking place. Referring again to FIG. 4, the "high" "AWR/BRD" signal is also applied to the RE input of the RAM B. A "high" signal at the RE port of a RAM causes the RAM to read out from the addresses sequentially applied to the address port of the RAM. The ten address lines driven by the address counter 86 are fed by the multiplexer 80 to the address port of the RAM B. The address counter 86 recycles every 8 × 108 counts, generating the addresses of eight tracks of 108 bytes of a subblock of data being read from the RAM. The address counter 86 is driven by the 10 MHz clock 88, and the counter 86 is configured to generate the addresses so that the RAM output is sequenced to correspond to the original data format. The RAM output data is fed to the buffers 98, 100, whose outputs are bussed together, and the deskewed data from the RAM A and RAM B are thereby reassembled onto a common output bus.

It will be noted that the read operation from a RAM occurs at a 10 MHz rate, while the write operation, being under control of the channel transfer rate, occurs at a 5 MHz rate. This insures that read out is always completed before the write operation, and guarantees that the write operation controls the bank switching of the RAMs.

Each RAM of the preferred embodiment comprises two coupled 4K × 4 Static Random Access Memories having separate input and output control ports, Model IDT 71682 manufactured by Integrated Device Technology Corp. of Santa Clara Calif. Each RAM of the invention is therefore a 4K addressable, 8-bit wide (i.e. 1 byte) random access memory.

The invention has been described in detail with particular reference to preferred embodiments thereof, but it will be understood that variations and modifications can be effected within the spirit and scope of the invention. For example, the invention has been described in terms of a multitrack tape recorder system, but it will be appreciated that it may be applied to other systems with multiple digital data streams initially having coherence which may have become skewed with respect to each other, i.e. multi channel radio data transmission.

What is claimed is:

1. Apparatus for restoring time coherence to skewed time-sequenced data bit streams in parallel channels of a digital data processing system exhibiting random amounts of skew, said data bit streams having a format including clocks of bits preceded by a preamble, said apparatus comprising:

a. means for grouping data bits in each of said parallel channels into blocks of bits comprising sequentially occurring channel bytes of a fixed number of data bits;

b. means associated with each of said parallel channels for temporarily storing, respectively, the sequentially occurring channel bytes to provide a plurality of stored sequentially occurring channel bytes, the sequentially occurring channel bytes being stored at random times depending upon the amount of skew in said digital data processing system;

c. means for assigning a channel address segment to each of the temporarily stored channel bytes, to identify from which of said parallel channels each of the sequentially occurring channel bytes originates;

d. means for assigning a byte address segment to each of the temporarily stored channel bytes, to identify a sequentially occurring position of each of the sequentially occurring channel bytes within each of said blocks of bits;

e. means for signaling which of said means for temporarily storing channel bytes has a channel byte stored therein;

f. a first, byte oriented addressable, random access memory;

g. means, responsive to said signaling means, for writing into said first random access memory the temporarily stored channel byte at a random memory address corresponding to the channel address segment and the byte address segment of a byte written into said first random access memory;

h. a second, byte oriented addressable random access memory having stored channel bytes therein from the block of bits preceding the block of bits from which the byte just written into said first random access memory belongs;

i. means for reading out previously written channel bytes from said second random access memory to thereby provided deskewed data;

j. means for bank switching said first random access memory and said second random access memory whereby a write function of said first random access memory and a read function of said second random access memory are interchanged; and k. means for merging the bytes read from said first and said second random access memories, to provided deskewed blocks of digital data corresponding to a multiplicity of blocks of skewed data.

2. The apparatus of claim 1 wherein separate channel control clocks are derived, respectively, from each skewed time-sequenced data bit streams.

3. The apparatus of claim 1 wherein said means for writing into a random access memory and said means for reading gout of a random access memory are activated simultaneously, and said means for reading out operates at a higher rate than said means for writing in.

4. The apparatus of claim 3 wherein said means for reading out operates at least twice the rate of said means for writing in.

5. Apparatus for deskewing digital data in parallel channels of a data system, said digital data having a format including blocks of bits preceded by a preamble said apparatus comprising:

a. means for grouping digital data in each of said parallel channels into bytes;

b. means for generating identifying addresses for each of the bytes;

c. first and second random access memories for storing bytes at addressed corresponding to an identifying address of a stored byte;

d. means for writing bytes into aid first random access memory simultaneously with reading previously written bytes from said second random access memory, whereby the previously written bytes being read are deskewed; and e. means for alternately interchanging the reading and writing means of said first and said second random access memories.

6. A method for restoring time coherence to skewed time-sequenced data bit streams in parallel channels of a digital data processing system, said data bit streams having a format including blocks of bits precede by a preamble, said method comprising the steps of:

a. grouping data bits in each of said parallel channels into blocks of bits comprising sequentially occurring channel bytes of a fixed number of data bits;

b. temporarily storing, respectively, the sequentially occurring channel bytes to provide a plurality of stored sequentially occurring channel bytes, the channel bytes being stored at random times depending upon the amount of skew in said digital data processing system;

c. assigning a channel address segment to each of the temporarily stored channel bytes, to thereby identify from which of the parallel channels each of the channel bytes originates;

d. assigning a byte address segment to each of the temporarily stored channel bytes, to identify a sequentially occurring position of each of the sequentially occurring channel bytes within each of said blocks of bits;

e. signaling the temporarily storing of a channel byte;

f. writing, in response to the signaling operation of step (e) above, the temporarily stored channel byte in a first, byte oriented addressable random access memory at a random memory address corresponding to the channel address segment and the byte addresses segment of the byte written into the first random access memory;

g. reading gout said previously written bytes from a second, byte oriented random access memory, to thereby provided deskewed data;

j. bank switching said first random access memory and said second random access memory whereby the write function of said first random access and the read function of said second random access memories are interchanged; and k. merging the bytes read from said first and said second random access memories, to provide deskewed blocks of digital data corresponding to a multiplicity of blocks of skewed data.

* * * * *